(12) United States Patent  
Krittian et al.

(10) Patent No.: US 9,745,972 B2  
(45) Date of Patent: Aug. 29, 2017

(54) DRIVE TRAIN OF A VEHICLE

(71) Applicant: Linde Hydraulics GmbH & Co. KG, Aschaffenburg (DE)

(72) Inventors: Lukas Krittian, Aschaffenburg (DE); Martin Steigerwald, Glattbach (DE); Martin Oberhausser, Aschaffenburg (DE); Alfred Langen, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 642 days.

(21) Appl. No.: 14/082,428

(22) Filed: Nov. 18, 2013

(65) Prior Publication Data

US 2014/0212305 A1    Jul. 31, 2014

(30) Foreign Application Priority Data

Nov. 22, 2012   (DE) .......................... 10 2012 111 296

(51) Int. Cl.
*F04B 35/00*    (2006.01)
*B66F 9/22*    (2006.01)
(Continued)

(52) U.S. Cl.
CPC .............. *F04B 35/002* (2013.01); *B66F 9/22* (2013.01); *E02F 9/2217* (2013.01);
(Continued)

(58) Field of Classification Search
CPC ..... F02N 9/04; F02N 7/08; F02N 7/00; F15B 1/027; F15B 1/0275; F15B 1/033;
(Continued)

(56) References Cited

U.S. PATENT DOCUMENTS 4,382,484 A * 5/1983 Anderson ................ B60K 6/12  
138/30  
6,202,783 B1 * 3/2001 Taylor ..................... B60T 1/093  
180/305

(Continued)

FOREIGN PATENT DOCUMENTS

CN         101037087 A        9/2007
CN         102549219 A        7/2012
(Continued)

OTHER PUBLICATIONS

"Description FR 2708236" (Patent Translate by EPO and Google, English, retrieved on Feb. 17, 2016 <URL: http://worldwide.espacenet.com>).*

(Continued)

*Primary Examiner* — F. Daniel Lopez
*Assistant Examiner* — Richard Drake
(74) *Attorney, Agent, or Firm* — The Webb Law Firm

(57) ABSTRACT

A drive train (1) includes an internal combustion engine (2) and working hydraulics (4) having at least one hydraulic pump (7). When operated as a pump, the hydraulic pump (7) sucks hydraulic fluid from a tank (9) and delivers into a delivery line (10) that leads to the working hydraulics (4). When operated as a motor, the hydraulic pump (7) is supplied with hydraulic fluid from a hydraulic accumulator (25). The drive train (1) has a charge pump (20) to supply a charging circuit (23). The charge pump (20), when operated as a pump, sucks hydraulic fluid out of the tank (9) and delivers into a charge pressure line (22) that leads to a charging circuit (23), and the charge pump (20) when operated as a motor is supplied with hydraulic fluid from the hydraulic accumulator (25).

20 Claims, 4 Drawing Sheets

(51) Int. Cl.
E02F 9/22 (2006.01)
F02N 7/08 (2006.01)
F15B 1/02 (2006.01)
F02N 7/00 (2006.01)
F15B 1/033 (2006.01)
F02N 11/08 (2006.01)

(52) U.S. Cl.
CPC .......... *E02F 9/2289* (2013.01); *E02F 9/2292* (2013.01); *E02F 9/2296* (2013.01); *F02N 7/00* (2013.01); *F02N 7/08* (2013.01); *F15B 1/024* (2013.01); *F02N 11/0814* (2013.01); *F15B 1/033* (2013.01); *F15B 2211/20523* (2013.01); *F15B 2211/20546* (2013.01); *F15B 2211/20569* (2013.01); *F15B 2211/20576* (2013.01); *F15B 2211/212* (2013.01); *F15B 2211/613* (2013.01); *F15B 2211/781* (2013.01); *F15B 2211/851* (2013.01); *F15B 2211/88* (2013.01)

(58) Field of Classification Search
CPC .......... F15B 2211/275; F15B 2211/851; F15B 2211/88; F15B 11/162; F15B 1/02; F04B 35/002
USPC .................................................. 60/396, 464
See application file for complete search history.

(56) References Cited

U.S. PATENT DOCUMENTS

| | | | |
|---|---|---|---|
| 6,339,928 B1 * | 1/2002 | Gollner | F16H 57/04 60/464 |
| 7,806,796 B2 | 10/2010 | Zhu | |
| 9,151,019 B2 | 10/2015 | Ono et al. | |
| 9,429,170 B2 * | 8/2016 | Krittian | F02N 7/06 |
| 2010/0122864 A1 | 5/2010 | Rosman | |
| 2012/0060777 A1 * | 3/2012 | Tikkanen | F01P 7/044 123/41.11 |
| 2012/0233991 A1 | 9/2012 | Ivantysynova et al. | |
| 2016/0341168 A1 * | 11/2016 | Dolger | F02N 7/00 |

FOREIGN PATENT DOCUMENTS

| | | | | |
|---|---|---|---|---|
| DE | 2542244 A1 | | 3/1977 | |
| DE | 3247335 A1 | * | 9/1983 | ............... B60K 6/12 |
| DE | FR 2708236 A1 | * | 2/1995 | ............ B60K 25/00 |
| DE | 102011104919 A1 | | 10/2012 | |
| DE | 102011105006 A1 | | 10/2012 | |
| EP | 2044335 | | 4/2009 | |
| EP | 2308795 A1 | | 4/2011 | |
| EP | 2570381 A1 | | 3/2013 | |
| JP | 2007224737 A | | 9/2007 | |
| WO | 2008009950 A1 | | 1/2008 | |
| WO | 2011140972 A1 | | 11/2011 | |

OTHER PUBLICATIONS

DE 3247335 (Machine translation of the "Description" by Google on PATENTSCOPE, English. retrieved on Feb. 16, 2016 <URL: https://patentscope.wipo.int>).*

Description DE 2542244 (Patent Translate by EPO and Google, English, retrieved on Feb. 17, 2016. <URL: http://worldwide.espacenet.com>).*

* cited by examiner

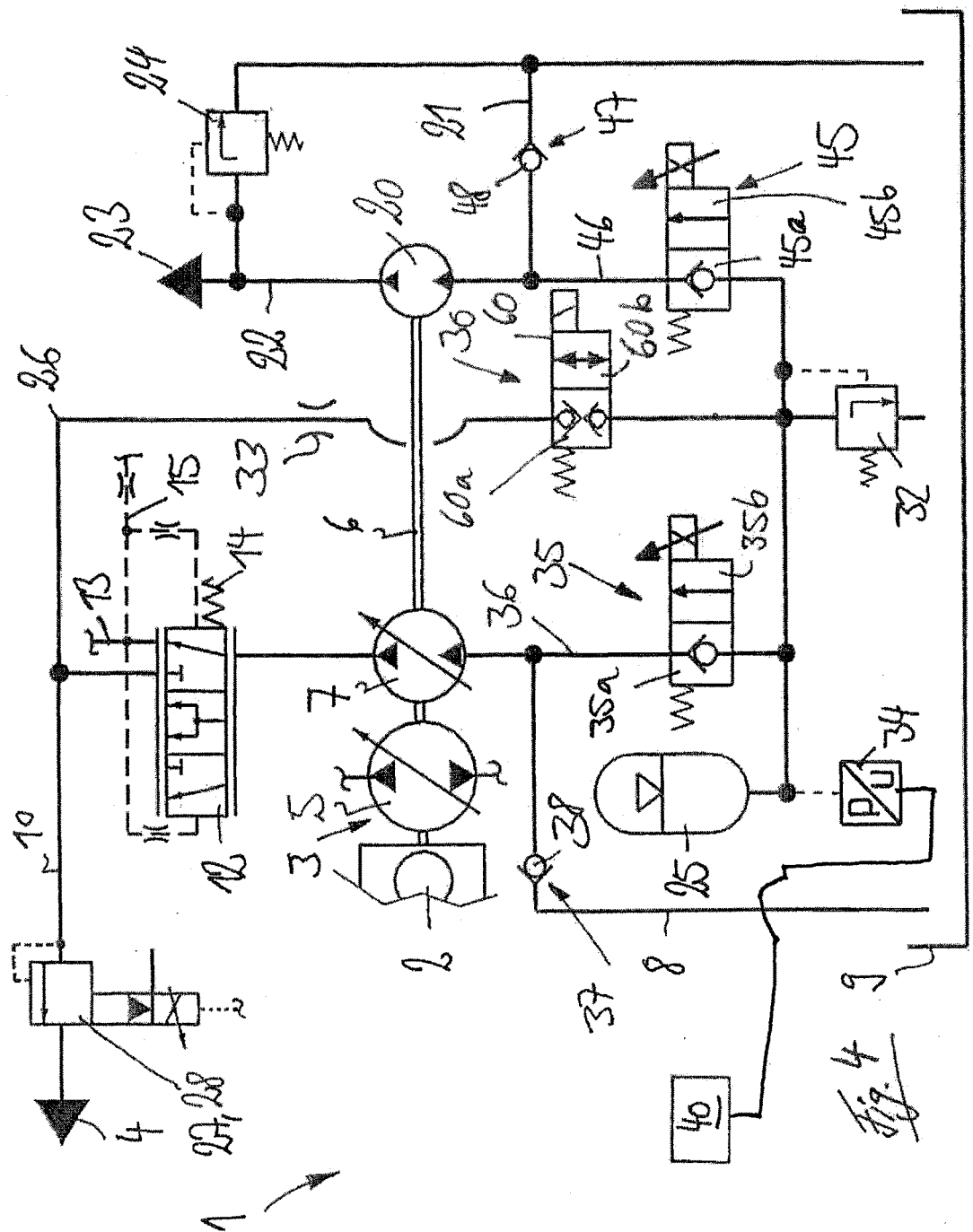

DRIVE TRAIN OF A VEHICLE

CROSS REFERENCE TO RELATED APPLICATION

This application claims priority to German Application No. DE 102012111296.7 filed Nov. 22, 2012, which is herein incorporated by reference in its entirety.

BACKGROUND OF THE INVENTION

Field of the Invention

This invention relates to a drive train of a vehicle, such as a mobile machine, with an internal combustion engine and working hydraulics driven by the internal combustion engine. The working hydraulics have at least one hydraulic pump driven by the internal combustion engine, which hydraulic pump can be operated as a pump and as a motor. When operated as a pump, the hydraulic pump takes in hydraulic fluid from a tank on a suction side and delivers into a delivery line that leads to the working hydraulics. When operated as a motor, the hydraulic pump can be supplied with hydraulic fluid from a hydraulic accumulator on the suction side. The drive train has a charge pump driven by the internal combustion engine to supply a charging circuit.

Description of Related Art

Self-propelled mobile machines, such as industrial trucks, agricultural equipment, forestry equipment, and construction equipment, such as excavators, wheeled and telescoping loaders, tractors, combine harvesters, forage harvesters, sugar beet and potato diggers, have a drive train with an internal combustion engine which drives a traction drive and the working hydraulics that perform the work functions of the machine. At least one hydraulic pump driven by the internal combustion engine is provided to supply the working hydraulics with hydraulic fluid.

During idle operation, when the traction drive and the working hydraulics are not actuated and, therefore, no torque is required from the internal combustion engine, the internal combustion engine is operated at a lower idle speed. Idle operation of this type occurs during pauses or interruptions in the work.

To reduce the fuel consumption of the internal combustion engine during pauses or interruptions in work, a start-stop function can be provided for the internal combustion engine in which the idling internal combustion engine is shut off during pauses or interruptions in work and is automatically restarted when there is a demand for torque from a work function or the traction drive. The shutoff and subsequent restarting of the internal combustion engine can occur even after relatively brief idle times, so that the starting process of the internal combustion engine is an operation that must be carried out correspondingly frequently and at short intervals during the operation of the internal combustion engine. This requirement places severe demands on the starter device of the internal combustion engine with regard to fatigue strength and the ability to deliver the starting energy required to start the internal combustion engine.

On internal combustion engines, such as diesel or gasoline engines, starter devices driven by an electric motor are generally used. To start the internal combustion engine from a shutdown, the speed of rotation necessary for the self-sustaining running of the internal combustion engine is produced with an electric starter motor connected with the crankshaft of the internal combustion engine by a transmission. The transmission is generally formed by a pinion gear on the output shaft of the electric starter motor and a ring gear on the crankshaft of the internal combustion engine and has a high translation ratio so that a high-speed and compact electric starter motor can be used.

On known starter devices operated with electric motors with a high-speed and compact electric starter motor, very high currents are required to flow for a short period of time to produce the torque necessary to start the internal combustion engine. The currents that are generated to start the internal combustion engine result in a significant increase in temperature. If the internal combustion engine has to be restarted after short intervals for a start-stop function, this operating behavior results in the overheating of known starter devices, the failure of the electric starter motor, and failure of the starter device operated by the electric motor. To be able to actuate a conventional starter device of this type driven by an electric motor with an electrical starter motor for a start-stop function at brief intervals, the level of the electric voltage must be increased and the electric starter motor must be designed so that it has a correspondingly high fatigue strength, although that results in a significant increase in the design effort and manufacturing costs required.

On mobile machines, during the process of starting the internal combustion engine, the hydraulic pump of the working hydraulics (which is located in the drive train) also requires additional energy. Existing electric-motor driven, geared-down starter devices of the internal combustion engine are therefore unsuitable for economically creating a start-stop function having the appropriate fatigue strength and supplying the necessary starting energy.

In drive trains of a similar type used in a mobile machine, hydrostatic power units are used as hydraulic starters of the internal combustion engine for a start-stop function. The hydrostatic power units are in a drive connection with the crankshaft of the internal combustion engine and are operated with hydraulic fluid from a hydraulic accumulator during a starting process of the internal combustion engine. DE 10 2011 105 006 A1 describes a drive train in which, in addition to the hydraulic pump of the working hydraulics, an additional hydraulic motor is provided that functions as a starter of the internal combustion engine to achieve a start-stop function of the internal combustion engine. Because an additional hydraulic motor is in coupled motion during the normal operation of the running internal combustion engine, losses occur which reduce the overall efficiency of the machine.

To eliminate the cost and effort required for an additional hydraulic motor as a starter of the internal combustion engine, the hydraulic pump that is already present for the working hydraulics can be used as a hydraulic starter of the internal combustion engine by operating the hydraulic pump as a motor which is supplied with hydraulic fluid from a hydraulic accumulator on the suction side. A drive train of this type is described in EP 2 308 795 A1. The hydraulic pump, such as an axial piston machine, for example, of the working hydraulics of known drive trains is generally designed for high suction limit speeds (rotational speed) when it is operated as a pump. The suction side with the suction inlet, which in pump operation is connected with the tank, has a correspondingly large cross section. In motor operation, in which the hydraulic accumulator is connected with the suction side of the hydraulic pump of the working hydraulics, the casing of the hydraulic pump generally does not have sufficient strength to withstand high pressures, so that when it is being operated as a motor, the hydraulic pump can be operated only with limited pressures on the suction side. As a result, when the hydraulic pump is operated as a motor, only a limited torque is available in the drive train. To introduce a higher torque into the drive train when the hydraulic pump is operated as a motor, the suction side and the suction inlet of the hydraulic pump could be designed with a high compression strength, although that requires complex and expensive structural modifications to the hydraulic pump which increase the manufacturing costs of the hydraulic pump.

Therefore, it is an object of this invention to provide a drive train of the general type described above but in which an increased torque can be introduced in the drive train with little construction effort or expense.

SUMMARY OF THE INVENTION

To accomplish this object, the invention teaches that the charge pump can be operated as a pump and as a motor. When operated as a pump, the charge pump takes in hydraulic fluid from a tank on the suction side and delivers it into a charge pressure line which leads to a charging circuit. When the charge pump is operated as a motor, hydraulic fluid can be supplied to the suction side from the hydraulic accumulator. In the drive train of the invention, therefore, the hydraulic pump of the working hydraulics and the charge pump can each be operated as a motor with hydraulic fluid from the hydraulic accumulator. Because of the motor operation of the charge pump of the invention, the torque that can be introduced into the drive train can be increased with little additional construction effort or expense. No complex or expensive modifications to the hydraulic pump of the working hydraulics are thereby necessary so that, when the hydraulic pump and the charge pump are operated as motors, a high total torque can be introduced into the drive train with little added construction effort or expense. In addition, because the hydraulic pump (which is already present in the drive train for the working hydraulics) and the charge pump (which is already present in the drive train) are used to introduce a torque, this provides advantages with regard to the efficiency and the space occupied by the drive train. No additional hydraulic motors are required in the drive train that are operated with hydraulic fluid from the hydraulic accumulator and which are used only to deliver additional torque to the drive train and which cause corresponding drag losses in addition to the output of an additional torque.

In one advantageous embodiment of the invention, the hydraulic pump is in the form of a hydraulic starter to start the internal combustion engine which has a start-stop function. When the hydraulic pump is operated as a motor, in which the hydraulic pump is driven with hydraulic fluid from the hydraulic accumulator, a hydraulic starter to start the internal combustion engine can be formed in a simple manner to achieve a start-stop function.

In one advantageous embodiment of the invention, the charge pump functions as a hydraulic starter to start the internal combustion engine with a start-stop function and/or functions as a booster drive to assist the internal combustion engine which is already running. When the charge pump of the invention is operated as a motor, the torque for the starting process can be easily increased, for example during a cold start, to achieve a torque that is sufficient to start the shut-off internal combustion engine or, with a corresponding limitation of the pressure on the suction side of the hydraulic pump and motor operation, to generate a torque that is sufficient to start the shut-off internal combustion engine. With a charge pump that can be operated as a motor in this manner, a booster drive can be achieved and an additional torque can be introduced into the drive train, with which the running internal combustion engine can be assisted during an acceleration process or during traction operation of the vehicle at a steady speed, at a target speed and during the actuation of the working hydraulics. The hydrostatic booster drive provided by the charge pump makes it possible to reduce the amount of fuel used by the internal combustion engine and to downsize the internal combustion engine.

In one advantageous embodiment of the invention, there is a first electrically actuated control valve to control the connection of the hydraulic accumulator with the suction side of the hydraulic pump, and a second electrically actuated control valve to control the connection of the hydraulic accumulator with the suction side of the charge pump. This arrangement makes it possible in a simple manner to control the operation as a motor of the hydraulic pump of the working hydraulics and the operation as a motor of the charge pump separately from each other by means of respective control valves. Thus, when the hydraulic pump of the working hydraulics is operated as a pump and the working hydraulics are actuated, the internal combustion engine can be boosted with an additional torque from the charge pump by operating the charge pump as a motor. The presence of separate control valves also makes it possible to adjust the torque to start the shut-off internal combustion engine so that for a cold start of the internal combustion engine, the hydraulic pump is operated together with the charge pump as a motor and, for a warm start, only the hydraulic work pump or the charge pump is operated as a motor.

The first control valve is preferably located in a connecting line that leads from the hydraulic accumulator to an intake line of the hydraulic pump, which intake line leads from the reservoir to the suction side of the hydraulic pump.

If a shutoff valve that shuts off the flow to the tank is located in the intake line that leads from the tank to the suction side of the hydraulic pump (such as a check valve that shuts off the flow toward the reservoir), when the hydraulic pump is operated as a motor, it is easily possible to prevent an outflow of the hydraulic fluid from the hydraulic accumulator into the tank, and when the hydraulic pump is operated as a pump, to achieve an intake of hydraulic fluid from the tank.

The second control valve is preferably located in a connecting line that leads from the hydraulic accumulator to an intake line of the charge pump, which intake line leads from the tank to the suction side of the charge pump.

If a shutoff valve that shuts off the flow to the tank is located in the intake line that leads from the tank to the suction side of the charge pump (such as a check valve that shuts off the flow to the tank), when the charge pump is operated as a motor, it is easily possible to prevent an outflow of the hydraulic fluid from the hydraulic accumulator into the tank, and when the charge pump is operated as a pump, to achieve an intake of hydraulic fluid from the tank.

In an alternative embodiment of the invention, there is a common electrically actuated control valve to control the connection of the hydraulic accumulator with the suction side of the hydraulic pump and to control the connection of the hydraulic accumulator with the suction side of the charge pump. With a common control valve, the operation of the hydraulic pump as a motor and the operation of the charge pump as a motor can be controlled jointly with little construction effort or expense. In a drive train in which, on account of a corresponding limitation of the potential pressure on the suction side of the hydraulic pump when it is operated as a motor, sufficient torque cannot be achieved to start the shut-off internal combustion engine, when the charge pump is operated as a motor and there is a common control valve to control the operation of the hydraulic pump and of the charge pump as motors, it becomes possible with little construction effort or expense to generate sufficient torque to start the shut-off internal combustion engine.

The common control valve is preferably located in a connecting line that leads from the hydraulic accumulator to a common suction (intake) channel of the hydraulic pump and of the charge pump. The common suction channel connects the suction side of the hydraulic pump and the suction side of the charge pump with the tank. A common suction channel for the hydraulic pump and the charge pump further reduces the construction effort and expense required for the two pumps that can be operated as motors.

The presence of a common suction channel for the hydraulic pump of the working hydraulics and for the charge pump makes it possible to locate a shutoff valve that shuts off the flow to the tank in the common suction channel (such as a check valve that shuts off the flow to the tank). Therefore, only a single shutoff valve is necessary in the common suction channel to ensure that, when the hydraulic pump and the charge pump are both operating as motors, an outflow of hydraulic fluid from the hydraulic accumulator into the tank is prevented and hydraulic fluid can be sucked out of the tank when the hydraulic pump and the charge pump are operated as pumps.

In one advantageous embodiment of the invention, the hydraulic accumulator can be connected to the delivery line for charging. A hydraulic fluid line that leads to the hydraulic accumulator is connected to the delivery line of the hydraulic pump that leads to the working hydraulics. It thereby becomes possible in a simple manner to charge the hydraulic accumulator with hydraulic fluid which is delivered into the delivery line by the hydraulic pump of the working hydraulics, which is operating as a pump.

A shutoff valve is advantageously located in the hydraulic fluid line. With a shutoff valve of this type, the hydraulic accumulator can easily be charged with hydraulic fluid in the open position of the shutoff valve. After the charging process, the hydraulic accumulator, which has been charged with hydraulic fluid, can be shut off when the shutoff valve is in the shutoff position.

In one advantageous embodiment of the invention, the shutoff valve is a check valve that opens the flow to the hydraulic accumulator automatically and as a function of the pressure. A check valve of this type is relatively compact and makes it possible to charge the hydraulic accumulator with hydraulic fluid by means of the delivery line and to shut off the hydraulic accumulator after the charging process.

The hydraulic accumulator can be charged during an actuation of a hydraulic consumer of the working hydraulics. To ensure that a sufficient volume flows to the actuated consumer during the simultaneous charging of the hydraulic accumulator, and thus that the actuated consumer is operated at the desired speed of movement, in one advantageous development of the invention a flow control device, such as a diaphragm or throttle, is located in the hydraulic fluid line. With a flow control device of this type in the form of a throttle or diaphragm in the hydraulic fluid line that leads to the hydraulic accumulator, it is easily possible, in connection with a check valve that has a simple design and can be easily installed in the hydraulic fluid line, to limit the volume of the charging flow into the hydraulic accumulator.

In an alternative embodiment of the invention, the shutoff valve is in the form of an electrically actuated control valve with a closed position and an open position. With an electrically actuated control valve of this type, it is also advantageously possible to charge the hydraulic accumulator with hydraulic fluid by means of the delivery line and, after the charging process, to shut off the hydraulic accumulator. The control valve, by means of a corresponding actuation, makes it possible to limit the charging volume flow into the hydraulic accumulator under appropriate operating conditions.

If, as in one embodiment of the invention, a pressure sensor is operatively associated with the hydraulic accumulator, it is easily possible, in connection with an electronic control device that controls a charging valve, to control the charging process of the hydraulic accumulator and the connection with the control valve or the control valves of the discharge operation of the hydraulic accumulator.

In one development of the invention, a charging valve for charging of the hydraulic accumulator that controls (throttles) the flow in the delivery line is located in the delivery line of the hydraulic pump that leads to the working hydraulics and the hydraulic fluid line is connected to the delivery line upstream of the charging valve. With a charging valve of this type, even in operating conditions in which no consumer of the working hydraulics is actuated, the delivery line can be throttled to make possible a charging of the hydraulic accumulator by the delivery flow delivered by the hydraulic pump operating as a pump.

It is particularly advantageous if, as in an additional embodiment of the invention, the charging valve is a retarder valve which, when the vehicle is braked, is actuated into a throttle position that throttles the delivery line. With a retarder valve of this type, by throttling the delivery line of the hydraulic pump when the vehicle is braking, an additional braking torque can be impressed on the output shaft formed by the crankshaft. This counteracts the torque that acts as a motor on the drive pump and, thus, decelerates the vehicle. During braking operation with a retarder valve of this type, it is also easily possible to recover the braking energy and to charge the hydraulic accumulator so that the kinetic energy of the vehicle during a braking process is used to charge the hydraulic accumulator.

In one development of the invention, the hydraulic pump supplies a hydraulic steering device and, associated with the delivery side of the hydraulic pump, is a priority valve for the priority supply of the hydraulic steering system. The delivery line of the working hydraulics is connected to the output side of the priority valve. When the hydraulic pump is operatively associated with a priority valve of this type, it becomes easily possible to guarantee the priority supply of a steering device. As a result of the connection of the connecting line of the hydraulic accumulator to the delivery line that leads from the priority valve to the working hydraulics, the process of charging the hydraulic accumulator has no effect on the prioritization and the priority of the steering device.

To start the internal combustion engine, the hydraulic pump and/or the charge pump are preferably operated as motors. Depending on the torque required to start the shut-off internal combustion engine, only the hydraulic pump or the hydraulic pump together with the charge pump can be operated as a motor to provide sufficient torque in the drive train to start the internal combustion engine.

For a booster drive when the internal combustion engine is running, the charge pump is advantageously operated as a motor. Because the charge pump generally has a lower displacement than the hydraulic pump, when the charge pump is operated as a motor with the internal combustion engine running, it is possible to feed additional torque into the drive train over a relatively long period of time, so that the booster drive of the charge pump makes it possible to reduce the fuel consumption of the internal combustion engine, or the booster drive of the charge pump can be used to downsize the internal combustion engine.

The hydraulic pump of the working hydraulics can be a constant displacement pump with a fixed displacement volume or a variable displacement pump with a variable displacement volume.

The hydraulic pump of the working hydraulics is advantageously an axial piston machine, preferably an axial piston machine that employs a swashplate construction, or a radial piston machine or a gear machine.

BRIEF DESCRIPTION OF THE DRAWINGS

Additional advantages and details of the invention are explained in greater detail on the basis of the exemplary embodiments illustrated in the accompanying schematic figures, in which like reference numbers identify like parts throughout.

FIG. 4 is another exemplary embodiment of a drive train of the invention.

DESCRIPTION OF THE PREFERRED EMBODIMENTS

Figure 1:
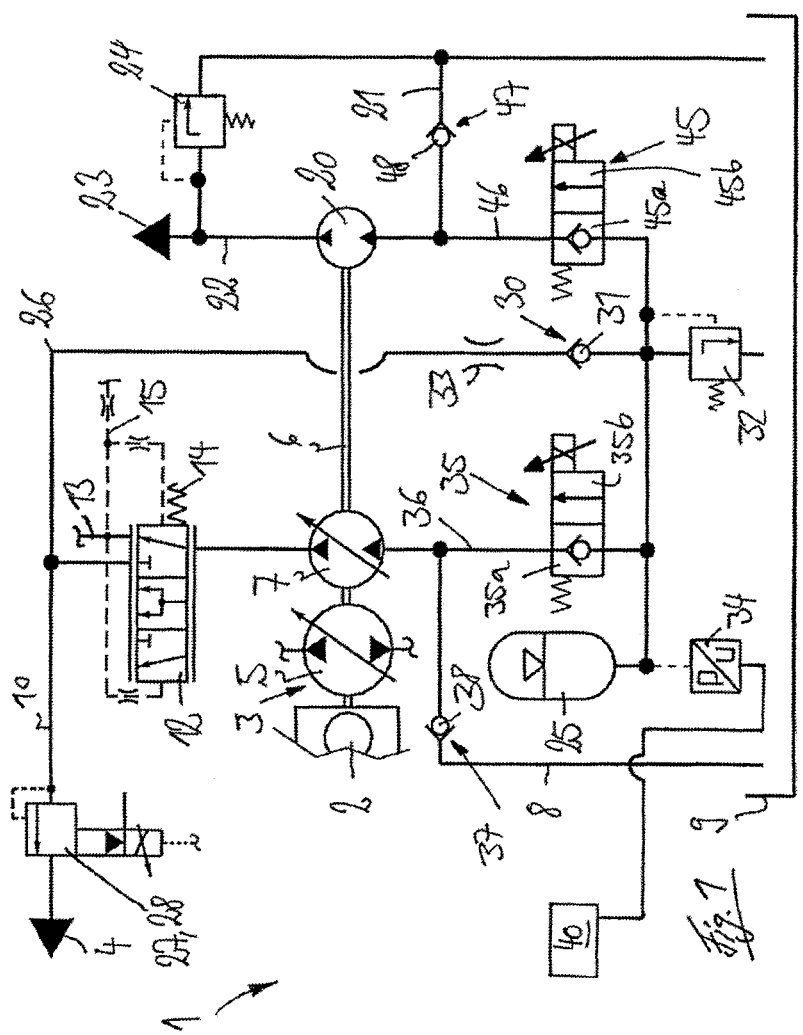
FIG. 1 is a schematic illustration of a first exemplary embodiment of a drive train of the invention.

FIG. 1 is a schematic illustration of a drive train 1 of the invention of a mobile machine, e.g., of an industrial truck or a piece of construction or agricultural equipment.

The drive train 1 includes an internal combustion engine 2, such as a diesel engine, a traction drive 3 driven by the internal combustion engine 2, and working hydraulics 4 driven by the internal combustion engine 2.

In the illustrated exemplary embodiment, the traction drive 3 is a hydrostatic traction drive which includes a variable displacement drive pump 5 driven by a connection with an output shaft 6 of the internal combustion engine 2. The traction pump 5 is in communication with one or more fixed or variable intake hydraulic motors in a closed-circuit, which intake hydraulic motors are in an operative connection with the driven wheels of the machine in a conventional manner.

The traction drive 3 can alternatively be an electric traction drive with an electric generator driven by the internal combustion engine 2 and one or more electric traction motors. The traction drive 3 can also be a mechanical traction drive with a mechanical transmission, such as a multi-speed gear transmission or a power split transmission or a torque converter transmission.

The working hydraulics 4 comprise the work functions of the machine, such as, on an industrial truck, for example, working hydraulics to actuate load handling means on a lifting mast, or on a piece of construction equipment in the form of an excavator, for example, the work functions of the working apparatus in the form of a shovel.

In the illustrated exemplary embodiment, the working hydraulics 4 comprise at least one hydraulic pump 7 which is operated in an open circuit and is driven by a drive connection with the output shaft 6 of the internal combustion engine 2. The hydraulic pump 7 of the working hydraulics 4 in the exemplary embodiment illustrated in FIG. 1 is a variable displacement pump with a variable displacement volume, such as an axial piston machine employing a swashplate construction. The hydraulic pump 7 of the working hydraulics 4 can alternatively be a constant displacement pump with a constant displacement volume.

The hydraulic pump 7 is in communication on its input side (suction side) with a tank 9 by means of an intake line 8. A delivery line 10 is in connection on the output side with the delivery side of the hydraulic pump 7 and is connected to a control valve device, by means of which it is possible to control the hydraulic consumers of the working hydraulics 4. The control valve device preferably comprises one or more directional control valves for the actuation of the consumers. In the illustrated exemplary embodiment, there is also a priority valve 12 with which the priority supply of a consumer supplied by the hydraulic pump 7, such as a hydraulic steering device, can be ensured. The priority valve 12 is in communication on the input side with the delivery side of the hydraulic pump 7 and is in communication on the output side with the delivery line 10 that leads to the working hydraulics 4 and also with a delivery line 13 that leads to the steering device. The priority valve 12 is controlled by a spring 14 and by the load pressure of the steering device present in a load pressure line 15.

The drive train 1 further comprises a charge pump 20, which is driven by the output shaft 6. The charge pump 20 is a constant displacement pump with a constant displacement volume which is operated in an open circuit. The charge pump 20 is in communication on the suction side by means of an intake line 21 with the tank 9 and delivers into a charge pressure line 22 which is connected to the delivery side, and to which the corresponding consumers of a charging circuit 23 are connected, such as displacement devices to adjust the displacement volume of the traction pump 5 and of the hydraulic pump 7, a charge device of the hydrostatic traction drive, a braking device of the vehicle, and pilot valves for the control valves of the working hydraulics 4. To protect the charge pressure in the charging pressure circuit 23, a pressure limiting device 24, such as a pressure relief valve, is associated with the charge pressure line 22.

In the drive train 1, the hydraulic pump 7 of the working hydraulics 4 is a two-quadrant power unit which can be operated as a pump and a motor in the same direction of operation and the same flow direction of the hydraulic fluid.

When it is operated as a pump, the hydraulic pump 7 sucks in hydraulic fluid from the tank 9 via the intake line 8 and delivers the hydraulic fluid via the priority valve 12 into the delivery line 10 of the working hydraulics 4 and/or the delivery line 13 of the steering device. When the hydraulic pump 7 is operated as a motor, in which the hydraulic pump 7 acts as the hydraulic starter of a start-stop function to start the internal combustion engine 2, the hydraulic pump 7 is driven on the suction side with hydraulic fluid from a hydraulic accumulator 25.

To charge the hydraulic accumulator 25 with hydraulic fluid, the hydraulic accumulator 25 is connected to the delivery line 10 of the hydraulic pump 7 that leads to the working hydraulics 4 by means of a hydraulic fluid line 26.

Located in the delivery line 10 is an electrically actuated charging valve 27 which, when it is actuated, can be actuated into a throttling position in which it throttles the delivery line 10 to build up a pressure. The charging valve 27 is preferably a retarder valve 28 which, during the braking of the vehicle, is actuated into a throttling position so that by building up pressure in the delivery line 10, an additional decelerating torque can be impressed on the output shaft 6 formed by the crankshaft, which counteracts the motor-torque generated by the drive pump 5 and thus decelerates the vehicle. The hydraulic fluid line 26 is connected to the delivery line 10 upstream of the charging valve 27 and, therefore, between the charging valve 27 and the priority valve 12.

Located in the hydraulic fluid line 26 is a shutoff valve 30, which in the illustrated example is a check valve 31 that opens automatically and as a function of the pressure to allow flow to the hydraulic accumulator 25. Also located in the hydraulic fluid line 26 between the shutoff valve 30 and the hydraulic accumulator 25 is a pressure relief valve 32 to control the pressure in the hydraulic accumulator 25. Also located in the hydraulic fluid line 26 to limit the charge volume flow of the hydraulic accumulator 25 is a flow control device 33 which can be a diaphragm or throttle. The flow control device 33 can be, as illustrated, located upstream of the shutoff valve 30 or, alternatively, downstream of the shutoff valve 30.

Also associated with the hydraulic fluid line 26 between the shutoff valve 30 and the hydraulic accumulator 25 is a pressure sensor 34. The pressure sensor 34 monitors the charging pressure and, thus, the charging status of the hydraulic accumulator 25.

The connection of the hydraulic accumulator 25 with the suction side of the hydraulic pump 7 for the operation of the hydraulic pump 7 as a motor can be controlled by a first electrically actuated control valve 35. The control valve 35 has a closed position 35a and an open position 35b. The closed position 35a is preferably leak-tight with a shutoff valve that shuts off the flow to the hydraulic pump 7.

The control valve 35 is located in a connecting line 36 which runs from the hydraulic fluid line 26 between the shutoff valve 30 and the hydraulic accumulator 25 to the intake line 8 that runs to the suction side of the hydraulic pump 7.

Located in the intake line 8 of the hydraulic pump 7 is a shutoff valve 37 that shuts off the flow to the tank 9 and is preferably a check valve 38 that shuts off the flow to the tank 9.

In the drive train 1, the charge pump 20 is also a two-quadrant power unit which can be operated as a pump and motor in the same direction of rotation and the same direction of flow of the hydraulic medium.

When it is operating as a pump, the charge pump 20, by means of the intake line 21 connected to the suction side, sucks hydraulic fluid out of the tank 9 and delivers it into the charge pressure line 22 connected with the delivery side of the charge pump 20. When the charge pump 20 is operating as a motor, in which the charge pump 20, in addition to the hydraulic pump 7, acts as a hydraulic starter of a start-stop function to start the internal combustion engine 2 and/or as a booster drive to assist the running internal combustion engine 2, the charge pump 20 is driven on the suction side with hydraulic fluid from the hydraulic accumulator 25.

A second electrically actuated control valve 45 is provided to control the connection of the hydraulic accumulator 25 with the suction side of the charge pump 20 for the operation of the charge pump 20 as a motor. The control valve 45 has a closed position 45a and an open position 45b. The closed position 45a is preferably leak-tight with a shutoff valve that shuts off the flow to the charge pump 20.

The additional control valve 45 is located in a connecting line 46 which leads from the hydraulic fluid line 26 between the shutoff valve 30 and the hydraulic accumulator 25 to the intake line 21 of the charge pump 20.

Also located in the intake line 21 that leads from the tank 9 to the suction side of the charge pump 20 is a shutoff valve 47 that blocks the flow toward the tank 9, and is preferably a check valve 48 that shuts off the flow to the tank 9.

An electronic control device 40 is in communication on the input side with the pressure sensor 34 and is used to actuate the charging valve 27 as well as the first control valve 35 and the second control valve 45.

Figure 2:
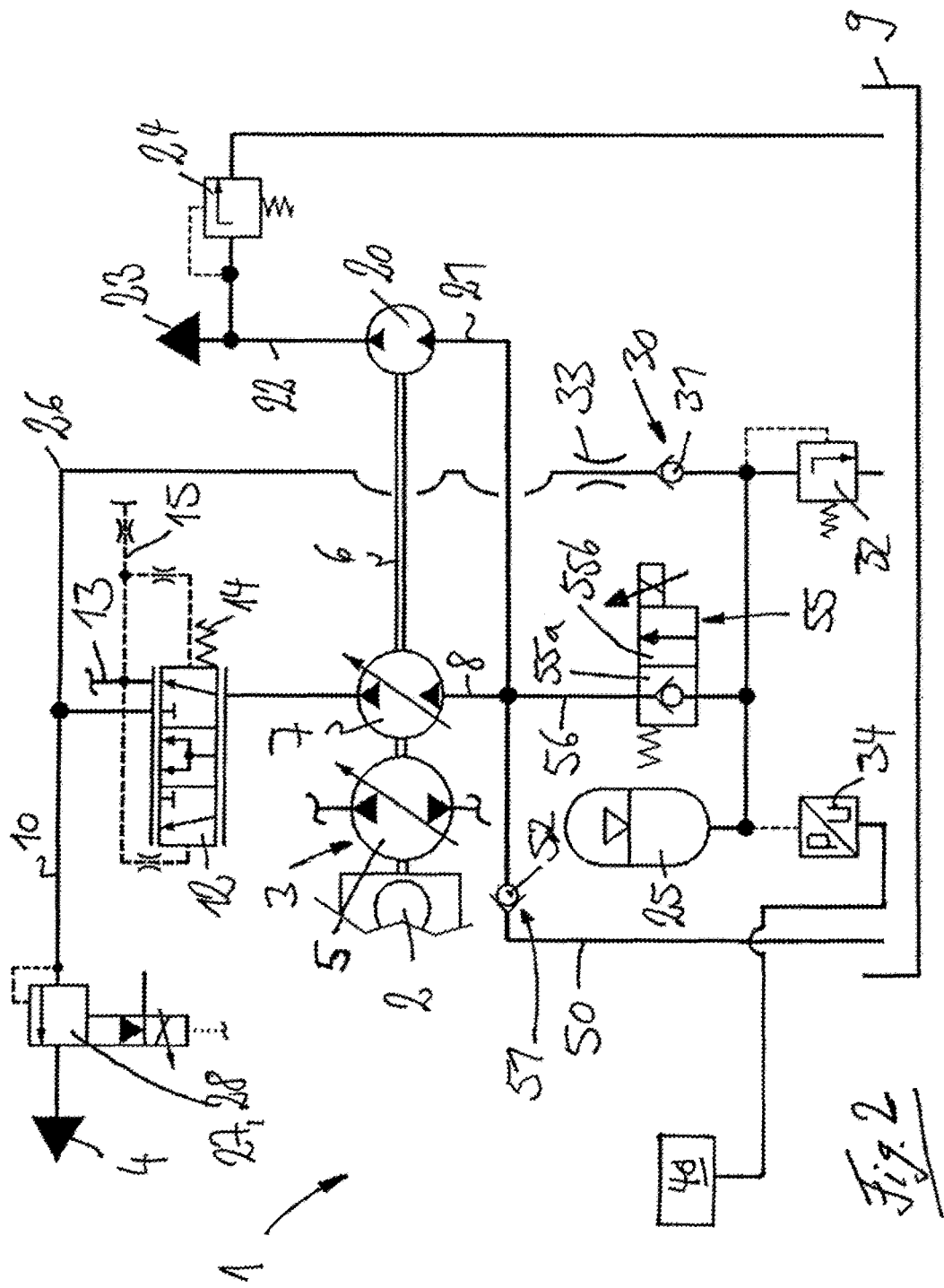
FIG. 2 is a schematic illustration of a second exemplary embodiment of a drive train of the invention.

FIG. 2 illustrates an embodiment of a drive train 1 of the invention in which the hydraulic pump 7 of the working hydraulics 4 and the charge pump 20 have a common suction channel (intake) 50, which connects the suction side (and thus the intake line 8) of the hydraulic pump 7 and the suction side (and thus the intake line 21) of the charge pump 20 with the tank 9. Located in the common suction channel 50 is a shutoff valve 51 that shuts off the flow to the tank 9, and is preferably a check valve 52 that shuts off the flow to the tank 9.

To control the connection of the suction sides of the hydraulic pump 7 and of the charge pump 20 for operation of the two power units as motors, there is a common electrically actuated control valve 55. The control valve 55 has a closed position 55a and an open position 55b. The closed position 55a is preferably leak-tight with a shutoff valve that shuts off the flow to the suction inlet 50. The control valve 55 can be actuated by the electronic control device 40.

The common control valve 55 is located in a connecting line 56 which leads from the hydraulic fluid line 26 between the shutoff valve 30 and the hydraulic accumulator 25 to the common suction channel 50 of the hydraulic pump 7 and of the charge pump 20.

Figure 3:
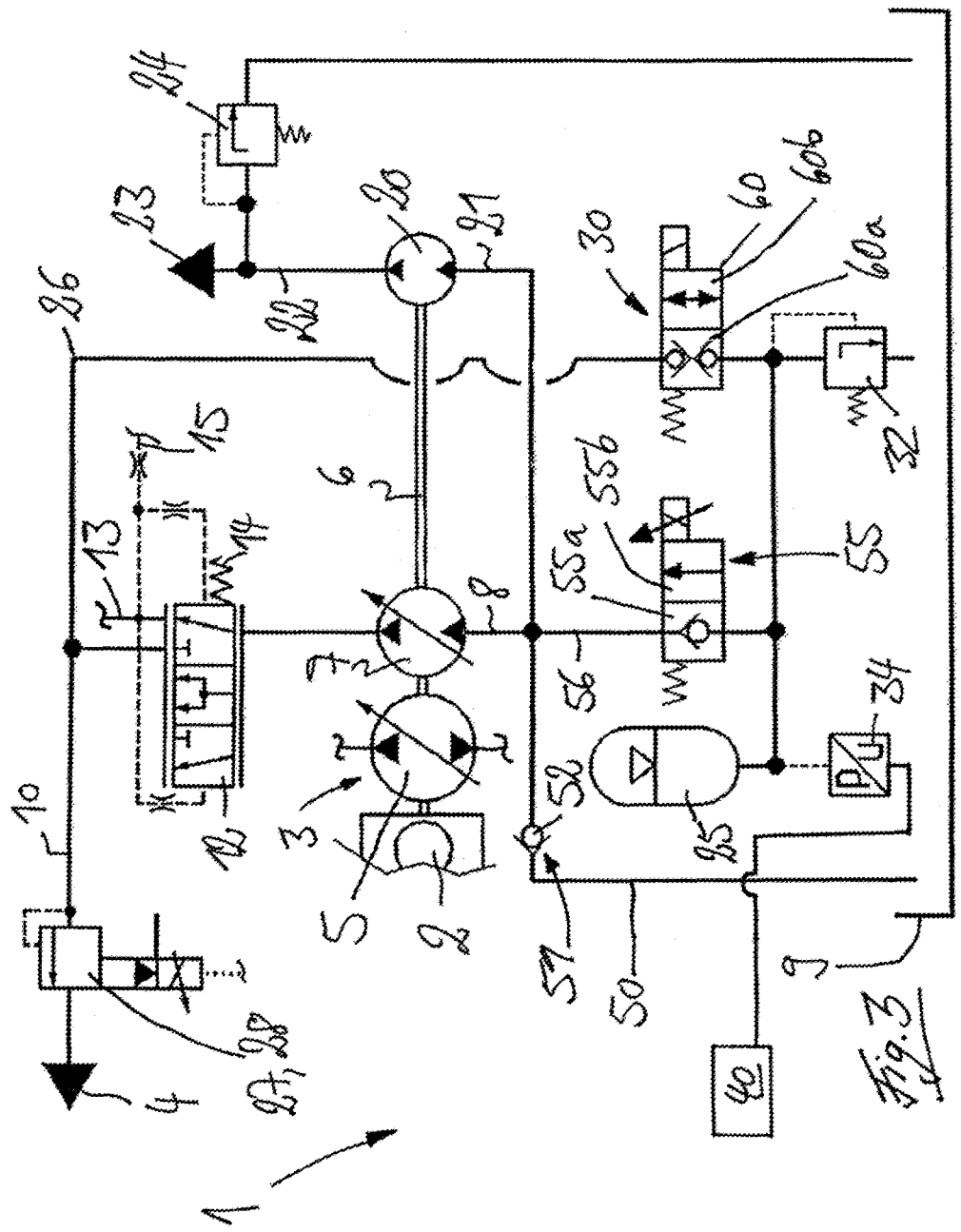
FIG. 3 is a modification of the embodiment illustrated in FIG. 2.

FIG. 3 illustrates an exemplary embodiment of the drive train 1 of the invention in which, instead of the check valve 31 and the flow control device 33 located in the hydraulic fluid line 26, the shutoff valve 30 is an electrically actuated control valve 60 with a closed position 60a and an open position 60b. The closed position 60a is preferably leak-tight in both directions of flow with a shutoff valve that shuts off the flow to the hydraulic accumulator 25 and a shutoff valve that shuts off the flow to the delivery line 10.

The control valve 60 can also be actuated by means of the electronic control device 40.

The control valves 35, 45, 55 and the control valve 60 in FIGS. 1 to 3 can be switching valves or proportional valves that throttle the flow in intermediate positions.

In the drive train 1 illustrated in FIGS. 1 to 3, the hydraulic accumulator 25 can be charged with hydraulic fluid in a simple manner by means of the flow control device 33 and the check valve 31 (FIGS. 1 and 2) or the control valve 60 actuated into the open position 60b (FIG. 3) when a consumer of the working hydraulics 4 is actuated, if the load pressure of the consumer exceeds the charge pressure of the hydraulic accumulator 25. By means of a corresponding actuation of the charging valve 27 into a throttling position, the hydraulic accumulator 25 can also be charged by means of the flow control device 33 and the check valve 31 or the control valve 60 actuated into the open position 60b under operating conditions in which the internal combustion engine 2 has reserves of power. It is particularly advantageous if the charging valve 27 is a retarder valve 28 and is actuated into a throttling position during braking operation of the vehicle. In which case, the kinetic energy of the decelerating vehicle is used to charge the hydraulic accumulator 25 and thus energy can be recovered. During the deceleration of the vehicle by means of the hydrostatic traction drive 3, the drive pump 5 operates as a motor and drives the hydraulic pump 7 of the working hydraulics 4 so that the hydraulic accumulator 25 can be charged with hydraulic fluid by means of the retarder valve 28 actuated into the throttling position.

When the consumers of the working hydraulics 4 are actuated, the hydraulic pump 7 delivers a delivery flow for the actuation of the consumers of the working hydraulics 4 and also delivers a delivery flow to charge the hydraulic accumulator 25. To charge the hydraulic accumulator 25, the hydraulic pump 7 can be driven on the primary side by the power supplied by the internal combustion engine 2. In connection with the retarder valve 28, the hydraulic pump 7 is driven to charge to the hydraulic accumulator 25 with the kinetic energy of the vehicle which is recovered during the deceleration of the vehicle when it is braked.

When the hydraulic pump 7 of the working hydraulics 4 is operated as a motor, it acts as a hydraulic starter for the shut-off internal combustion engine 2 to achieve a start-stop function. For this purpose, in FIG. 1, when there is sufficient pressure in the hydraulic accumulator 25, the control valve 35 is actuated into the open position 35*b*. The shutoff valve 37 in the intake line 8 prevents a discharge of the hydraulic fluid from the hydraulic accumulator 25 into the tank 9. As soon as the starting speed of the internal combustion engine 2 has been exceeded, as determined by a rotational speed sensor associated with the internal combustion engine 2 or the output shaft 6 and connected with the control device 40, the control valve 35 is actuated into the closed position 35*a* to prevent a further emptying of the hydraulic accumulator 25.

In FIG. 1, to start the shut-off internal combustion engine 2, when the hydraulic pump 7 is being operated as a motor, the torque to start the internal combustion engine 2 is increased by the additional operation of the charge pump 20 as a motor by the actuation of the control valve 45 into the open position 45*b*. In addition, in FIG. 1, it is possible, by means of the two control valves 35, 45, to operate the charge pump 20 alone as a motor by actuating only the control valve 45 into the open position 45*b*, to make possible a booster drive by operating the charge pump 20 as a motor, in which mode the charge pump 20 introduces a torque into the drive train 1 that gives a boost to the running internal combustion engine 2. As a result of the operation of the charge pump 20 as a motor, the acceleration of the vehicle can be assisted by the booster drive and the additional torque of the charge pump 20 by connecting the hydraulic accumulator 25 with the charge pump 20 by means of the control valve 45 as the vehicle begins to accelerate. The duration of the boost process can be limited as a function of the charge status of the hydraulic accumulator 25, which is measured by the pressure sensor 34. If, when the vehicle has finished accelerating, there is still sufficient hydraulic fluid in the hydraulic accumulator 25, the charge pump 20 can continue to be operated as a motor even during travel of the vehicle at the steady target speed to utilize the momentum from the booster drive of the charge pump 20. In the same manner, by using only the charge pump 20 alone as a motor by means of the control valve 45, a boost can be provided to the internal combustion engine 2 during the actuation of one or more consumers of the working hydraulics 4, whereby the hydraulic pump 7 works as a pump, with an additional torque from the booster drive provided by the charge pump 20.

In FIGS. 2 and 3, in which the common operation of the hydraulic pump 7 and of the charge pump 20 as motors is controlled by the common control valve 55, the torque to start to the internal combustion engine 2 can be increased in a simple manner by means of the additional operation of the charge pump 20 as a motor in the open position 55*b* of the control valve 55. The hydraulic pump 7 and the charge pump 20 jointly form a hydraulic starter for the shut-off internal combustion engine 2 to achieve a start-stop function, so that with little extra construction effort or expense for the hydraulic pump 7 a sufficient torque to start the shut-off internal combustion engine 2 can be achieved.

FIG. 4 illustrates an alternative embodiment of the drive train shown in FIG. 1 in which the shutoff valve 30 and the flow control device 33 have been replaced with a an electrically actuated control valve 60. The electrically actuated control valve 60 has a closed position 60*a* and an open position 60*b*. The closed position 60*b* is preferably leak-tight in both directions of flow with a shutoff valve that shuts off the flow to the hydraulic accumulator 25 and a shutoff valve that shuts off the flow to the delivery line 10.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A drive train of a vehicle, comprising:
   an internal combustion engine;
   working hydraulics driven by the internal combustion engine, wherein the working hydraulics include at least one hydraulic pump driven by the internal combustion engine, wherein the hydraulic pump is operable as a pump and as a motor, wherein the hydraulic pump, when operated as a pump, sucks hydraulic fluid from a tank on a suction side and delivers into a delivery line that leads to the working hydraulics, and wherein the hydraulic pump, when operated as a motor, is supplied with hydraulic fluid from a hydraulic accumulator on the suction side;
   a charge pump driven by the internal combustion engine to supply a charging circuit including at least one consumer, wherein the charge pump is operable as a pump and as a motor, wherein the charge pump, when operated as a pump, sucks hydraulic fluid out of the tank on a suction side and delivers into a charge pressure line that leads to the charging circuit, and wherein the charge pump, when operated as a motor, is supplied with hydraulic fluid from the hydraulic accumulator on the suction side,
   a first electrically actuated control valve to control a connection of the hydraulic accumulator with the suction side of the hydraulic pump, and
   a second electrically actuated control valve to control a connection of the hydraulic accumulator with the suction side of the charge pump.

2. The drive train as recited in claim 1, wherein the hydraulic pump is a hydraulic starter for starting the internal combustion engine.

3. The drive train as recited in claim 1, wherein the charge pump is a hydraulic starter for starting the internal combustion engine and/or is a booster drive to provide a boost to the running internal combustion engine.

4. The drive train as recited in claim 1, wherein the first control valve is located in a connecting line that leads from the hydraulic accumulator to an intake line of the hydraulic pump, and wherein the intake line leads from the tank to the suction side of the hydraulic pump.

5. The drive train as recited in claim 4, wherein located in the intake line that leads from the tank to the suction side of the hydraulic pump is a shutoff valve that shuts off the flow to the tank, and wherein the shut off valve is a check valve.

6. The drive train as recited in claim 1, wherein the second control valve is located in a connecting line that leads from the hydraulic accumulator to an intake line of the charge pump, and wherein the intake line leads from the tank to the suction side of the charge pump.

7. The drive train as recited in claim 6, wherein located in the intake line that leads from the tank to the suction side of the charge pump is a shutoff valve that shuts off the flow to the tank, and wherein the shutoff valve is a check valve.

8. The drive train as recited in claim 1, wherein for charging, the hydraulic accumulator is connected to the delivery line, and wherein a hydraulic fluid line that leads to the hydraulic accumulator is connected to the delivery line of the hydraulic pump that leads to the working hydraulics.

9. The drive train as recited in claim 8, wherein a shutoff valve is located in the hydraulic line.

10. The drive train as recited in claim 9, wherein the shutoff valve is a check valve that opens flow to the hydraulic accumulator automatically and as a function of pressure.

11. The drive train as recited in claim 8, including a flow control device selected from the group consisting of a throttle located in the hydraulic line.

12. The drive train as recited in claim 9, wherein the shutoff valve is an electrically actuated control valve with a closed position and an open position.

13. The drive train as recited in claim 8, wherein in the delivery line of the hydraulic pump that leads to the working hydraulics, there is a charge valve that throttles the delivery line to charge the hydraulic accumulator, and wherein the hydraulic line is connected to the delivery line upstream of the charge valve.

14. The drive train as recited in claim 13, wherein the charge valve is a retarder valve which, during a braking operation, is actuated into a throttling position which throttles the delivery line.

15. The drive train as recited in claim 1, including a pressure sensor operatively associated with the hydraulic accumulator.

16. The drive train as recited in claim 1, wherein the hydraulic pump supplies hydraulic fluid to a hydraulic steering device, and wherein a priority valve is operatively associated with the delivery side of the hydraulic pump for priority supply to the hydraulic steering system, and wherein the delivery line of the working hydraulics is connected to the output side of the priority valve.

17. The drive train as recited in claim 1, wherein the hydraulic pump and/or the charge pump are operated as motors to start the internal combustion engine.

18. The drive train as recited in claim 1, wherein the charge pump is operated as a motor to act as a booster drive when the internal combustion engine is running.

19. The drive train as recited in claim 1, wherein the hydraulic pump of the working hydraulics is a constant displacement pump with a fixed displacement volume or a variable displacement pump with a variable displacement volume.

20. The drive train as recited in claim 1, wherein the hydraulic pump is an axial piston machine or a radial piston machine or a gear machine.

* * * * *